United States Patent
Kase

(10) Patent No.: US 6,711,530 B1
(45) Date of Patent: Mar. 23, 2004

(54) METHOD FOR EVALUATING ERROR IN SHAPE OF FREE CURVED SURFACE

(75) Inventor: Kiwamu Kase, Wako (JP)

(73) Assignee: Riken, Saitama (JP)

(*) Notice: Subject to any disclaimer, the term of this patent is extended or adjusted under 35 U.S.C. 154(b) by 0 days.

(21) Appl. No.: 09/529,663

(22) PCT Filed: Aug. 17, 1999

(86) PCT No.: PCT/JP99/04408

§ 371 (c)(1),
(2), (4) Date: Apr. 18, 2000

(87) PCT Pub. No.: WO00/11433

PCT Pub. Date: Mar. 2, 2000

(30) Foreign Application Priority Data

Aug. 19, 1998 (JP) .......................... 10-232521

(51) Int. Cl.⁷ .............................. G06F 17/50
(52) U.S. Cl. ........................................ 703/2
(58) Field of Search .............................. 703/2; 382/242, 382/266

(56) References Cited

U.S. PATENT DOCUMENTS

| | | | |
|---|---|---|---|
| 4,792,232 A | * 12/1988 | Jobe et al. | ........... 356/394 |
| 5,257,203 A | 10/1993 | Riley et al. | |
| 5,497,451 A | 3/1996 | Holmes | |
| 6,256,038 B1 | * 7/2001 | Krishnamurthy | ......... 345/419 |

FOREIGN PATENT DOCUMENTS

| EP | 0 211 345 A2 | * 7/1986 | ........... G06F/15/72 |
|---|---|---|---|
| JP | 5-346957 | 12/1993 | |
| JP | 11-65628 | 3/1999 | |

OTHER PUBLICATIONS

Gershon Elber, Elaine Cohen, "Second-Order Surface Analysis Using Hybrid Symbolic and Numerical Operators", Apr. 1993, ACM Transactions on Graphics, pp. 160–178.*

Farin, G.: "Curves and Surfaces for Computer-Aided Geometric Design", Book, 1988, Chapter 22, pp. 348–355, A Practical Guide, Academic Press, United States.

Gadh, R. and Sonithi, R.: "Geometric Shape Abstractions for Internet-Based Virtual Prototyping", Article, 1998, pp. 473–486, vol. 30, No. 6, Computer-Aided Design, Great Britain.

* cited by examiner

Primary Examiner—Russell Frejd
Assistant Examiner—Dwin M. Craig
(74) Attorney, Agent, or Firm—Griffin & Szipl, PC

(57) ABSTRACT

An original curved surface S is divided into up to six curved surface units by combinations of signs (+, 0, −) of a principal curvature ($k_1$, $k_2$) in each point on the curved surface. A distorted curved surface S' is associated with the original curved surface S and divided into curved surface units having the same boundary. An average normal vector is obtained for each curved surface unit with respect to the original curved surface and the distorted curved surface. "A bent component" and "a twisted component" in all the combinations of pairs of different curved surface units are obtained with respect to the original curved surface and the distorted curved surface. A difference between "the bent component" and "the twisted component" in each combination in the original curved surface and "the bent component" and "the twisted component" in each identical combination in the distorted curved surface is calculated.

3 Claims, 3 Drawing Sheets

METHOD FOR EVALUATING ERROR IN SHAPE OF FREE CURVED SURFACE

BACKGROUND OF THE INVENTION

1. Field of the Invention

The present invention relates to a method for evaluating a shape error of a free curved surface.

2. Description of the Prior Art

Conventionally, in press working or injection molding processing, a curved surface (i.e. an original curved surface), such as target CAD (Computer Aided Design) data and a curved surface associated therewith (i.e. a distorted curved surface), are typically "visually" compared. Any forming defects in the working or the processing are evaluated based on a difference, noted during the "visual" inspection, between these original and distorted curves. That is, for example in press working, if the distorted curved surface has been "bent" and "twisted" relative to the original curved surface, both curved surfaces are visually judged against one another and the metal mold is experientially adjusted.

The above-described visual experiential evaluation of the curves is simple and convenient, but it has problems to include large individual differences, dependence on the evaluator's experience, and extremely high arbitrariness. Therefore, a means for evaluating the entire bends and twists of the free curved surface by an objective, less arbitrary means for evaluation is desirable.

On the other hand, for this purpose, a formed article (i.e., distorted curved surface) that was actually formed by using, for example, formed sheet metal and the like, is measured by a Coordinate Measuring Machine or a digitizer. In this way, an image of the obtained measured result is displayed together with the original curved surface (i.e., CAD data and others) so that a shape error, such as bent or twisted shape error, can be roughly recognized by visual inspection. With this technique, however, it is difficult to visually recognize three-dimensional differences. Specifically, when a reference shape is not flat but has a complicated curve, a difference in the three-dimensional measurement between the distorted curved surface and the original curved surface can hardly be visually recognized.

Furthermore, if the distorted curved surface has a local "wrinkle", "bump" or "dent", the image is largely changed and the entire shape error is hard to evaluate by means of the conventional method.

SUMMARY OF THE INVENTION

The present invention is intended to solve the above-mentioned problems. Thus, a main object of the present invention is to provide a method for evaluating a shape error of a free curved surface, wherein an entire shape of an original curved surface, such as CAD data, is compared with an entire shape of a distorted curved surface, such as provided after forming, to easily and objectively determine a difference (i.e., error). Another object of the present invention is to provide a method capable of evaluating the entire shape of a free curved surface without being affected by a local "wrinkle", "bump" or "dent" in the free curved surface. Yet another object of the present invention is to provide a method for evaluating a shape error of a free curved surface in which the numerical calculation is facilitated, and the influence of errors in the numeric values and in the measurements are minimized so the method can be applied to both a parametric curved surface and a cloud of points.

According to the present invention, a method for evaluating a shape error of a free curved surface is provided which comprises: (a) step A for dividing an original curved surface S into up to six curved surface units by combinations of signs (+, 0, −) of a principal curvature ($K_1$, $K_2$) in each point on the curved surface; (b) step B for associating a distorted surface S' with the original curved surface S and dividing the distorted curved surface S' into curved surface units having the same boundary by projection along the normal vectors of S; (c) step C for obtaining an average normal vector for each curved surface unit with respect to the original curved surface and the distorted curved surface; (d) step D for obtaining "a bent component" and "a twisted component" of all combinations of pairs of the different curved surface units with respect to the original curved surface and the distorted curved surface; and (e) step E for calculating a difference between "a bent component" and "a twisted component" of the respective components in the original curved surface and "a bent component" and "a twisted component" of the same respective components in the distorted curved surface.

According to the above method of the present invention, if the curved surface remains to be continuous even after distortion, local irregularities (i.e., wrinkles, bumps or dents) can be canceled by taking an average of the normal vectors in each region (i.e., curved surface unit) of the free curved surface, and a global direction of that region (i.e., average normal vector) can be determined. Therefore, geometrical properties (i.e., a bent component, and a twisted component) of the curved surface can be readily and objectively evaluated, without ambiguity, based on the directional relationship relative to another region (i.e., another curved surface unit) of the average normal vector.

Moreover, since the geometrical properties (i.e., a bent component, and a twisted component) can be easily calculated using only the normal vector in each point on the curved surface, the numerical calculation is facilitated, and the influence of numeric errors and measurement errors is reduced. Consequently, the method in accordance with the present invention can be applied to both a parametric curved surface and clouds of points.

Furthermore, according to a preferred embodiment of the present invention, each curved surface unit is divided into two directions orthogonal to each other and the average normal vectors of the two divided regions are calculated in step C, and "a bent component" and "a twisted component" are obtained with respect to combinations of pairs of the average normal vectors in the two divided regions in the respective curved surface units in step D.

With this method in accordance with the present invention, dividing the same curved surface units in the original curved surface S into two directions provides two pairs of the bent component and the twisted component in the corresponding region, as well as the above-mentioned relationship relative to another region. Thus, it is possible to evaluate both the relationship with another region, and a change in shape in the corresponding region, with respect to each curved surface unit by this two-stage evaluation. In this way, the two-stage evaluation performs a more accurate shape error evaluation.

Other objects and advantageous characteristics of the present invention will be apparent from the following description with reference to the accompanying drawings.

BRIEF DESCRIPTION OF THE PREFERRED EMBODIMENTS

A free curved surface S=S(u, v) can be expressed by parameters u and v. Expression 3 is a relational expression in the differential geometry. This relationship is disclosed in, for example, "Curves and Surfaces for Computer Aided Geometric Design" (Farin, G, 1988, A Practical Guide. Academic Press).

Expression 3 is as follows:

$$E = S_M S_M, F = S_M S_V, G = S_V S_V, L = n S_{MM},$$

$$M = n S_{uv}, N = n S_w, n = \frac{S_u \times S_v}{\|S_u \times S_v\|} \quad (1)$$

The principal curvature is $K_1$, $K_2$, which can be obtained by solving Formula 2 of Expression 4.

Expression 4 is as follows:

$$\kappa^2 = \frac{NE - 2MF + LG}{EG - F^2} \kappa + \frac{LN - M^2}{EG - F^2} = 0 \quad (2)$$

Figure 1:
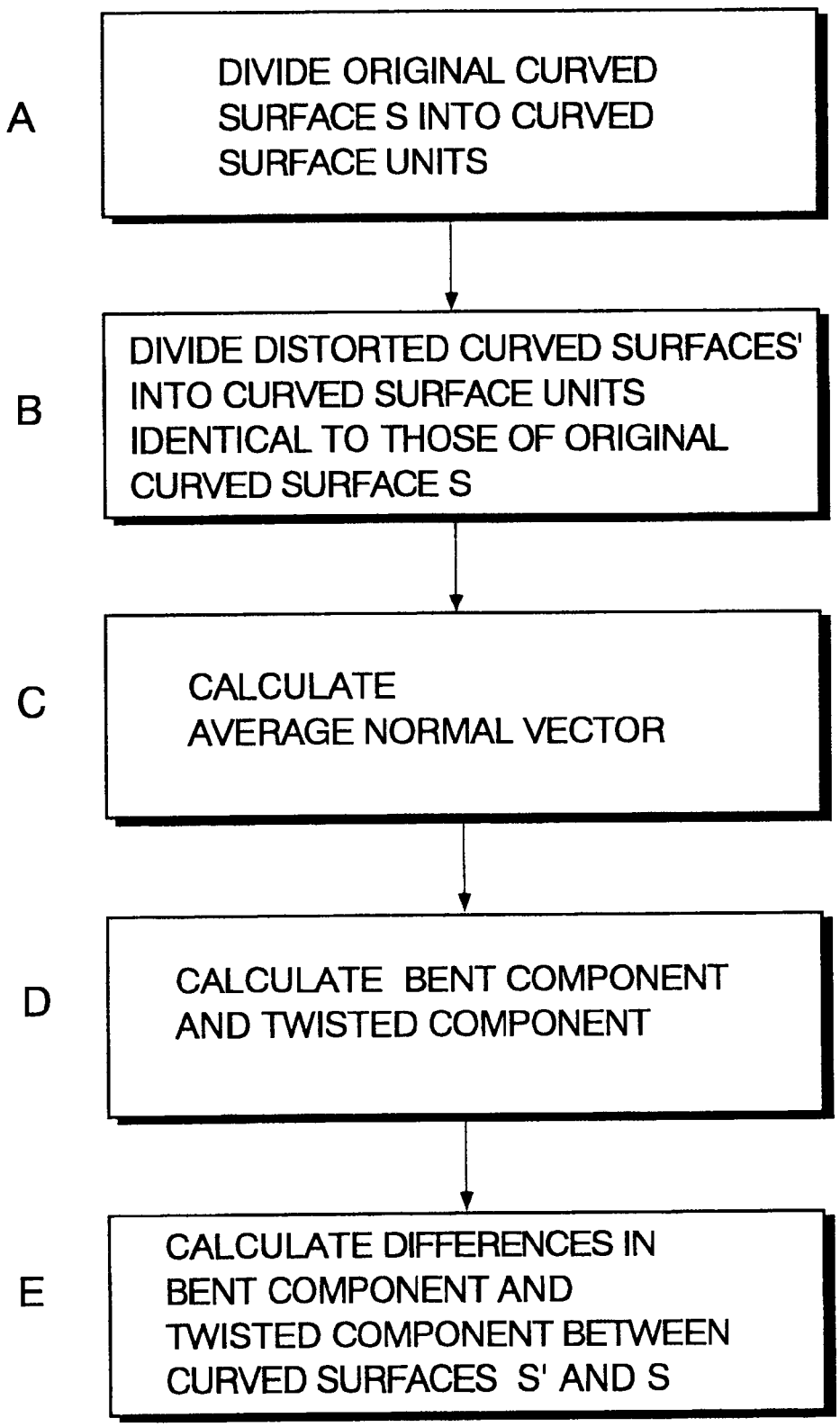
FIG. 1 is a flow chart outlining a method according to the present invention.
Figures 2A, 2B, 2C:
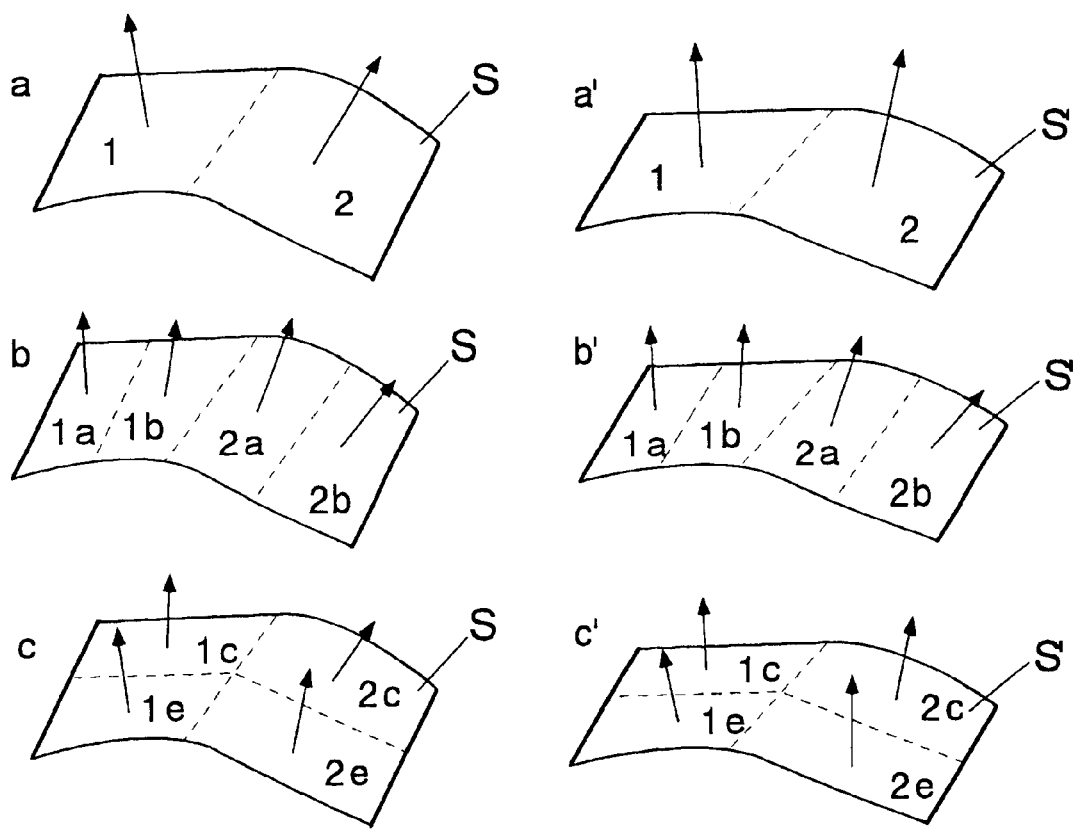
FIGS. 2A, 2B and 2C are schematic drawings corresponding to the flow chart of FIG. 1.

The method according to the present invention will now be described. FIG. 1 is a flow chart typically showing the method according to the present invention, and FIGS. 2A, 2B and 2C are schematic drawings corresponding to this flow chart. As shown in these drawings, the method according to the present invention basically comprises five steps A to E.

In a first step A, an original curved surface S is divided into up to six curved surface units by combinations of signs (+, 0, −) of the principal curvature ($K_1$, $K_2$) in each point on the original curved surface. The more the number of points for calculating the principal curvature increases, the more the accuracy can be improved. Additionally, the six possible combinations of the signs (+, 0, −) of the principal curvature ($K_1$, $K_2$) are: (+, +); (+, −); (+, 0); (−, −); (−, 0); and (0, 0). For example, (+, +) describes a convex surface such that both principal curvatures ($K_1$, $K_2$) are convex; (−, −) describes a concave surface such that both principal curvatures are concave; (+, −) describes a saddle-like surface such that both principal curvatures are concavo-convex; and (+, 0), (−, 0) or (0, 0), each describes a curved surface (cylindrical surface and the like) such that one of the two principal curvatures is linear. Therefore, the original curved surface S can be divided into up to six curved surface units (e.g., two curved surface units 1 and 2 in the example shown in FIGS. 2A, 2B and 2C) having the combined shape approximating, by dividing into curved surface units in step A, the original curved surface S. It is noted that the dividing method using combinations of the principal curvature s is disclosed in, for example, CAD Jrnl. V.30, N6. pp473–486 (1998), R. Gadh and R. Sonthi: "Geometric shape abstractions for internet-based virtural prototyping," and by others.

In a second step B, a distorted curved surface S' is associated with the original curved surface S, and also divided into the same number of curved surface units having the same boundary by projection along normal vectors of S, as shown in FIGS. 2A and 2B. In this case, each curved surface unit, for example 1 and 2, of the distorted curved surface S' may include different combinations of the principal curvature s.

In a third step C, the average normal vector is calculated for each curved surface unit, for example 1 and 2, with respect to the original curved surface S and the distorted curved surface S' as shown in FIG. 2C. Additionally, in the third step, each curved surface unit is divided into two directions orthogonal to each other. For example, as shown in FIG. 2C, the two directions orthogonal to each other could be 1a, 1b and 2a, 2b, or 1c, 1d and 2c, 2d. Subsequently, the normal average line vectors in each of the two divided regions of each curved surface unit are obtained. The method for calculating the average normal vector will be described later.

In a fourth step D, "a bent component" and "a twisted component" in all the combinations of the different curved surface units are obtained by calculation with respect to the original curved surface S and the distorted curved surface S' from the later-described formula. Furthermore, in step D, for each curved surface unit, "a bent component" and "a twisted component" in the combinations of pairs of the average normal vectors in the two divided regions are obtained.

A fifth step E calculates a difference between "a bent component" and "a twisted component" in each combination in the original curved surface and "a bent component" and "a twisted component" in each of the same combinations in the distorted curved surface S'.

If a plurality of curved surface units are defined in the original curved surface S in the above-described fourth step D, "a bent component" and "a twisted component" are obtained with respect to all the combinations of pairs of different curved surface units. Furthermore, as to the distorted curved surface S', "a bent component" and "a twisted component" are likewise obtained with respect to the corresponding curved surface units. Accordingly, when a difference of "a bent component" and "a twisted component" of combinations of the corresponding curved surface units is calculated in the fifth step E, the geometrical properties (i.e., a bent component, a twisted component, and a shape error as a difference between these two components) of the distorted curved surface S' relative to the original curved surface S can be objectively evaluated.

Furthermore, a change in shape in each curved surface unit can be objectively evaluated by (i) dividing each curved surface unit into two regions corresponding to the two orthogonal directions and obtaining the average normal vectors in the two divided regions in the third step C and by (ii) obtaining "a bent component" and "a twisted component" with respect to the combinations of pairs of the average normal vectors in the two divided regions in the fourth step D. Therefore, both the relationship relative to another region, and a change in shape in the corresponding region, can be evaluated with respect to each curved surface unit by performing this two-stage evaluation, thereby providing a more accurate shape error evaluation.

The calculation technique in the above-described method will now be described.

The average normal vector in the third step C corresponds to a result of a division of a synthetic vector, which is the sum of n unit normal vectors in respective points (n points: intersection points of normal vectors in the respective points on the original curved surface and straight lines parallel thereto in the case where the curved surface is a distorted curved surface), on the curved surface by n. In this case, it is determined that the starting points of the average normal vectors are the same in both the original curved surface S and the distorted curved surface S', and an average (i.e., a result of division of the synthetic vector of positional vectors at the respective points by n) of n points used for calculating the unit normal vector in the original curved surface is used. Therefore, one normal vector is defined for each curved surface unit.

In addition, the normal vector for each point on the curved surface corresponds to n in Formula (1) when the free curved surface is expressed as a parametric curved surface S=S(u, v). Moreover, when the curved surface is represented as several point groups on that curved surface, the normal vector can be approximately obtained by calculating an outer product of vectors toward adjacent two points which are not on the same straight line in each point. Thereafter, the average can be obtained after normalization (also referred to as "unit vectorization"), as similar to the case of the parametric curved surface. Therefore, the method according to the present invention can be similarly applied to the parametric curved surface and the point group.

Furthermore, when the surface remains to be a continuous curved surface after distortion, the local irregularities (i.e., wrinkles, bump or dent and others) can be canceled. Even if wrinkles or surface sinks exist on the distorted curved surface S', they can be offset so that the overall shape of the curved surface unit can be expressed by a single synthetic vector (i.e., average normal vector).

Figure 3:
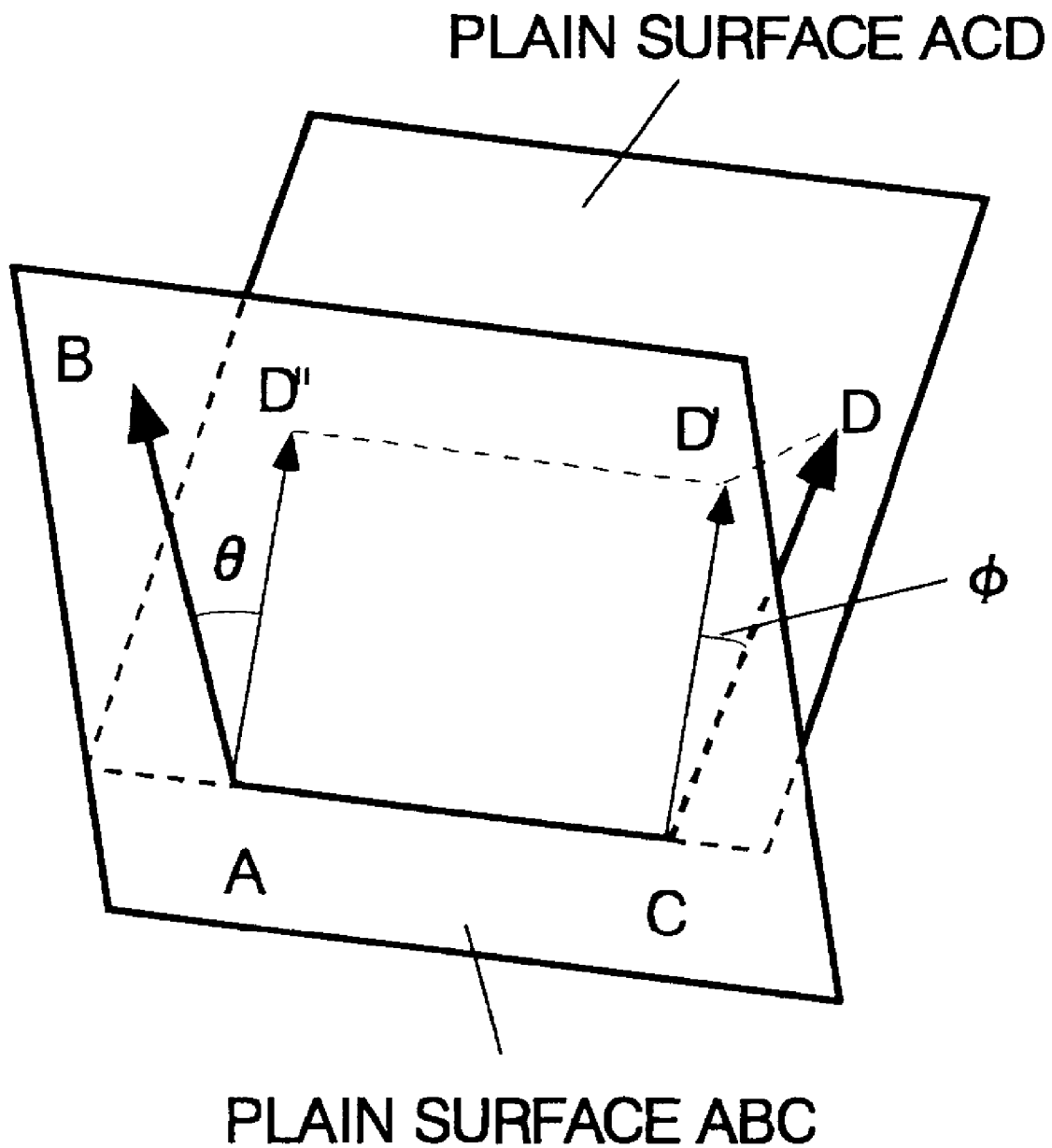
FIG. 3 shows the relationship between two normal vectors, a bent component θ and a twisted component φ.

FIG. 3 shows a technique for obtaining a bent component θ and a twisted component φ from the two normal vectors representative of the curved surface unit. As shown in the FIG. 3, assuming that: vectors AB and CD are average normal vectors with the respective points A and C as starting points; a vector CD', which is an orthogonal projection from the vector CD to a plain surface defined by three points A, B and C; and a vector AD", which is a vector parallel to the vector CD', it is possible to define that the bent component θ is an angle formed between the vectors AB and AD" and a twisted component φ is an angle formed by a plain surface ABC and a counterpart surface ACD.

Formulas (3) to (7) of Expressions 5 and 6 represent the bent component and the twisted component in the form of formulas. A sign of the bent component θ is determined by a function "sgn" as shown by Formula (3). If the sign of the element in parentheses of the function sgn(.) is positive, 1.0 is returned, and if the element is negative, −1.0 is returned. The normal vector of the plain surface ABC is determined as a vector n calculated by Formula (4), and Formula (5) is used to express a projection of the vector CD to the plain surface ABC as an angle with a sign as shown in Formula (6). It is to be noted that Arc cos denotes an inverse function of cosine.

Expression 5

$$\text{sgn}(\vec{AB}, \vec{CD}, \vec{CA}) = \begin{cases} +1 & \text{if } (\vec{AB} - \vec{CD}) \cdot \vec{CA} > 0 \\ -1 & \text{else} \end{cases}, \quad (3)$$

$$\vec{n} = \frac{\vec{AB} \times \vec{AC}}{|\vec{AB} \times \vec{AC}|} \quad (4)$$

$$\vec{CD'} = \vec{CD} - (\vec{n} \cdot \vec{CD})\vec{n} \quad (5)$$

$$\theta = \text{sgn}(\vec{AB}, \vec{CD}, \vec{CA}) \left| \text{Arccos}\left(\frac{\vec{AB} \cdot \vec{CD'}}{|\vec{AB} \cdot \vec{CD'}|}\right) \right|, \quad (6)$$

On the other hand, the twisted component φ can be expressed as an angle with a sign function as shown by Formula (7). In Formula (7), a sign representative of a direction is added to an angle formed between the plain surface ABC and the counterpart ACD with AC as a nodal line. It is to be noted that Arc sin is an inverse function of sin in Formula (7).

Expression 6

$$\phi = \text{Arcsin}\left(\frac{(\vec{AC} \times (\vec{AB} \times \vec{AC})) \times (\vec{AC} \times (\vec{CD} \times \vec{AC}))}{|(\vec{AC} \times (\vec{AB} \times \vec{AC}))||(\vec{AC} \times (\vec{CD} \times \vec{AC}))|} \cdot \frac{\vec{AC}}{|\vec{AC}|}\right) \quad (7)$$

where $\vec{AB} \times \vec{CD}$ represents an outer product of the vectors of AB and CD.

As described above, the method for evaluating a shape error of a free curved surface according to the present invention is advantageous in that: (a) the original curved surface, such as CAD data, can be readily and objectively compared with the distorted curved surface after forming for the entire shape, and a difference (error) thereof can be determined; (b) the entire shape of the free curved surface can be evaluated without being affected by local "wrinkles", a "bump" or a "dent"; (c) the numerical calculation is facilitated; (d) the influence of numeric error and measurement error is reduced; and (e) the method can be applied to both a parametric curved surface and a point group.

Although the present invention has been explained based on the preferred embodiments, it is understood that the scope of the invention is not restricted to these embodiments. On the contrary, the true scope of the invention includes improvements, modifications and equivalents within the appended claims.

What is claimed is:

1. A method for evaluating a shape error of a free curved surface comprising:
    dividing an original curved surface S into up to six curved surface units by combinations of signs (+, 0, −) of a principal curvature ($k_1$, $k_2$) in each point on said curved surface;
    associating a distorted curved surface S' with said original curved surface S and dividing it into curved surface units having the same boundary by projection along normal vectors of the curved surface S;
    calculating an average normal vector for each curved surface unit with respect to said original curved surface and said distorted curved surface;
    obtaining "a bent component" and "a twisted component" in all the combinations of pairs of different curved surface units with respect to said original curved surface and said distorted curved surface; and
    calculating a difference between "the bent component" and "the twisted component" in each combination in said original curved surface and "the bent component" and "the twisted component" in each identical combination in said distorted curved surface.

2. A method for evaluating a shape error of a free curved surface comprising the steps of:
    dividing an original curved surface S into up to six curved surface units by combinations of signs (+, 0, −) of a principal curvature ($K_1$, $K_2$) in each point on the curved surface S;
    associating a distorted curved surface S' with the original curved surface S and dividing the distorted curved surface S' into curved surface units having the same boundary by projection along normal vectors of the curved surface S;
    calculating an average normal vector for each curved surface unit with respect to the original curved surface S and the distorted curved surface S', wherein each curved surface unit is divided into two regions having orthogonal directions and average normal vectors in the two divided regions are calculated;

obtaining a bent component and a twisted component in all combinations of pairs of different curved surface units with respect to the original curved surface S and the distorted curved surface S', wherein the bent component and the twisted component are obtained with respect to combinations of pairs of the average normal vectors in the two divided regions in each curved surface unit; and calculating a difference between the bent component and the twisted component in each combination in the original curved surface S and the bent component and the twisted component in each identical combination in the distorted curved surface S'.

3. A method for evaluating a shape error of a free curved surface according to claim 2, wherein a bent component θ is calculated by Expression 1:

Expression 1

$$\text{sgn}(\vec{AB}, \vec{CD}, \vec{CA}) = \begin{cases} +1 & \text{if } (\vec{AB} - \vec{CD}) \cdot \vec{CA} > 0 \\ -1 & \text{else} \end{cases}, \quad (3)$$

$$\vec{n} = \frac{\vec{AB} \times \vec{AC}}{|\vec{AB} \times \vec{AC}|} \quad (4)$$

$$\vec{CD'} = \vec{CD} - (\vec{n} \cdot \vec{CD})\vec{n} \quad (5)$$

$$\theta = \text{sgn}(\vec{AB}, \vec{CD}, \vec{CA}) \left| \text{Arccos}\left( \frac{\vec{AB} \cdot \vec{CD'}}{|\vec{AB} \cdot \vec{CD'}|} \right) \right|, \quad (6)$$

and a twisted component φ can be calculated by Expression 2:

Expression 2

$$\phi = \text{Arcsin}\left( \frac{(\vec{AC} \times (\vec{AB} \times \vec{AC})) \times (\vec{AC} \times (\vec{CD} \times \vec{AC}))}{|(\vec{AC} \times (\vec{AB} \times \vec{AC}))||(\vec{AC} \times (\vec{CD} \times \vec{AC}))|} \cdot \frac{\vec{AC}}{|\vec{AC}|} \right) \quad (7)$$

where $\vec{AB} \times \vec{CD}$ represents an outer product of the vectors of AB and CD.

\* \* \* \* \*